United States Patent
Yen et al.

(10) Patent No.: US 8,200,036 B2
(45) Date of Patent: Jun. 12, 2012

(54) SYSTEM AND METHOD FOR ADJUSTING SENSITIVITY OF CAMERA MODULE

(75) Inventors: Wei-Shuen Yen, Taipei Hsien (TW); Ching-Feng Lin, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 1231 days.

(21) Appl. No.: 11/946,292

(22) Filed: Nov. 28, 2007

(65) Prior Publication Data

US 2009/0010563 A1  Jan. 8, 2009

(30) Foreign Application Priority Data

Jul. 6, 2007  (CN) .......................... 2007 1 0201013

(51) Int. Cl.
*G06K 9/40* (2006.01)
(52) U.S. Cl. ..................................... 382/274
(58) Field of Classification Search .......... 382/218–219, 382/221, 274, 275
See application file for complete search history.

(56) References Cited

U.S. PATENT DOCUMENTS

| | | | |
|---|---|---|---|
| 5,880,777 A * | 3/1999 | Savoye et al. .......... | 348/217.1 |
| 7,175,092 B2 | 2/2007 | Pettinelli, Jr. et al. | |
| 7,446,903 B2 * | 11/2008 | Hagai et al. .......... | 358/3.03 |
| 2002/0075494 A1 * | 6/2002 | Kakutani .......... | 358/1.9 |
| 2003/0227973 A1 * | 12/2003 | Nishibori et al. ........ | 375/240.16 |
| 2004/0227813 A1 * | 11/2004 | Perry .......... | 348/135 |
| 2005/0253925 A1 * | 11/2005 | Perry .......... | 348/135 |
| 2006/0256214 A1 * | 11/2006 | MacLean et al. .......... | 348/234 |

FOREIGN PATENT DOCUMENTS

| | | |
|---|---|---|
| CN | 1158531 A | 9/1997 |
| JP | 11-122543 A | 4/1999 |

* cited by examiner

*Primary Examiner* — Brian Le
(74) *Attorney, Agent, or Firm* — Altis Law Group, Inc.

(57) ABSTRACT

A system for adjusting a sensitivity of a camera module includes a memory unit configured for storing a plurality of pre-initialized pixel adjusting maps; an image capturing unit configured for capturing an image from the camera module and acquiring pixel values of the image to determine a pixel value range of the pixel values; a comparison unit configured for comparing the pixel range with the input-ranges of the pixel adjusting maps to determine which one of the input ranges of the pixel adjusting maps the pixel value range of the image; and an adjusting unit configured for adjusting the pixel value of the image to adjusting the sensitivity of the camera module according to the determined pixel adjusting map and outputting adjusted pixel values. The system can not only breakthrough the limit of the self-character of the amplifier, but also decrease noise in course of adjusting the sensitivity of the camera module.

4 Claims, 5 Drawing Sheets

| Input value | 0 | 25 | 50 | 75 | 100 | 120 | 128 |
|---|---|---|---|---|---|---|---|
| Output value | 0 | 90 | 180 | 200 | 212 | 231.3 | 255 |

111b

SYSTEM AND METHOD FOR ADJUSTING SENSITIVITY OF CAMERA MODULE

RELATED FIELD

The present invention relates to adjusting the quality of an image captured by a camera module, and more particularly, to a system and a method for adjusting sensitivity of the camera module.

BACKGROUND

A significant problem in capturing images by a camera module is capturing such images under widely varying lighting conditions and still achieving good image quality. In practice, lighting conditions can vary from fully acceptable lighting conditions (such as when capturing an image of a building at noon on a clear day) to minimal lighting conditions (such as capturing an image of furniture on the bottom shelf of a poorly lit warehouse at night). Often, it is impractical or impossible to control the lighting conditions. Nevertheless, it may be imperative to correctly adjust the sensitivity of the camera module.

Sensitivity is a light sensitive capability of the camera module in different conditions. Generally, the sensitivity can be adjusted by weighting pixel values generated by an image sensor when the image sensor detects incoming light. An amplifier is typically used to regulate the pixel values of the image sensor. However, the method of adjusting the sensitivity utilizing the amplifier is limited by characteristics of the amplifier. Furthermore, the image may be corrupted with signal noise and degraded.

It is desired to provide a system and a method for adjusting the sensitivity of a camera module which can overcome the above-described deficiencies.

SUMMARY

In accordance with a present embodiment, a system for adjusting a sensitivity of a camera module includes a memory unit, an image capturing unit, a comparison unit and an adjusting unit. The memory unit is configured for storing a plurality of pre-initialized pixel adjusting maps. Each of the pixel adjusting maps includes an input range and an output range corresponding to the input range. The image capturing unit is configured for capturing an image from the camera module and acquiring pixel values of the image to determine a pixel value range of the pixel values of the image. The comparison unit is configured for comparing the pixel value range with the input-ranges of the pixel adjusting maps to determine which one of the input ranges of the pixel adjusting maps most closely approximates the pixel value range of the image; and an adjusting unit configured for adjusting the pixel values of the image according to the pixel adjusting map whose input range most closely approximates the pixel value range of the image, and outputting the adjusted pixel values.

Other novel features and advantages will be drawn from the following detailed description of at least one preferred embodiment when considered in conjunction with the attached drawings.

BRIEF DESCRIPTION OF THE DRAWINGS

The present invention is described in detail hereinafter, by way of example and description of a preferred embodiment thereof and with reference to the accompanying drawings in which.

DETAILED DESCRIPTION OF THE PREFERRED EMBODIMENTS

A detailed explanation of a system and a method for adjusting a sensitivity of a camera module according to the present invention will now be made with reference to the drawings attached hereto.

Figure 1:
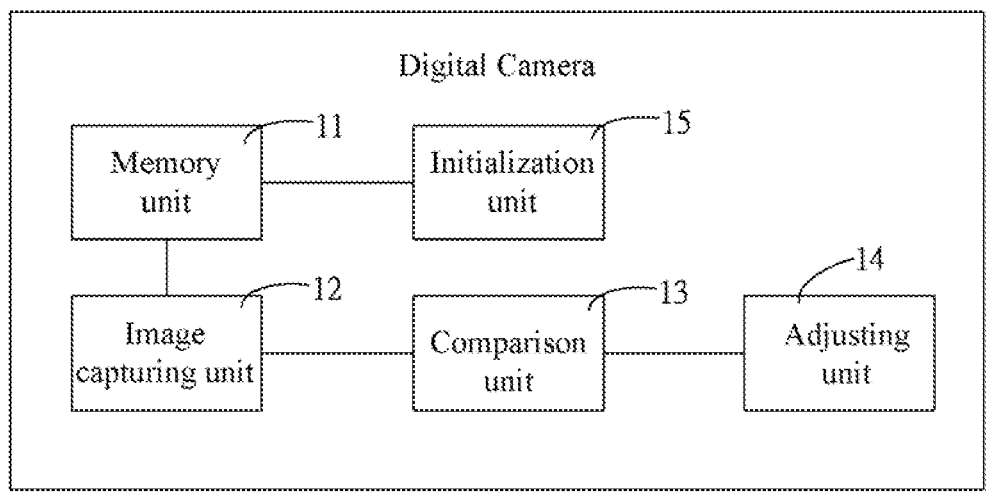
FIG. 1 is a block diagram of a digital camera incorporating a system for adjusting sensitivity of a camera module according to a preferred embodiment.

Referring to FIG. 1, a block diagram of a digital camera incorporating a system for adjusting sensitivity of a camera module is illustrated. The camera module can be similarly incorporated in various other electronic devices such as mobile telephones, personal digital assistants (PDAs), cellular phones, etc. The system includes a memory unit 11, an image capturing unit 12, a comparison unit 13, and an adjusting unit 14.

The memory unit 11 is configured for storing a number of pixel adjusting maps. It should be understood that the memory unit 11 can also store any other data, such as images, music, and so on.

Figure 2:
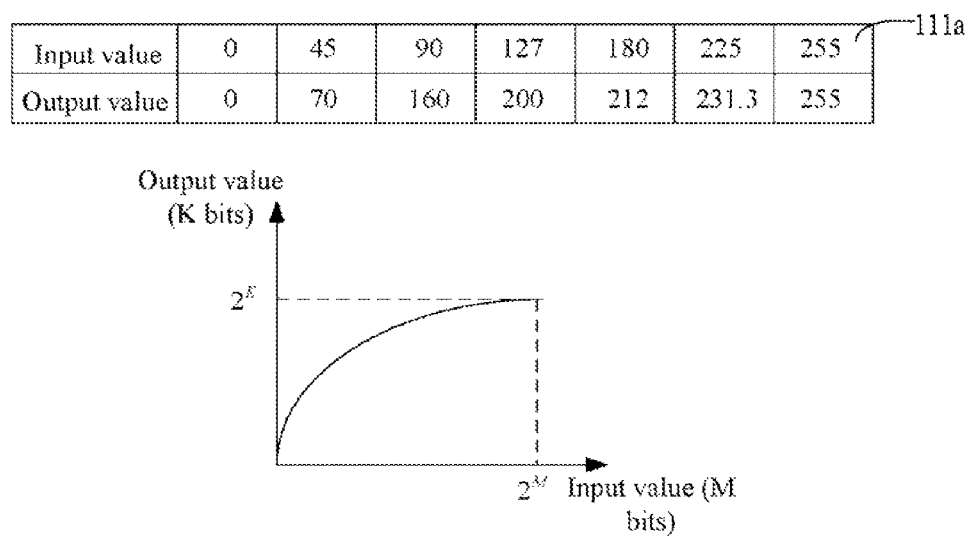
FIG. 2 is a pixel adjusting map and a gamma curve corresponding to the pixel adjusting map, according to the preferred embodiment.
Figure 3:
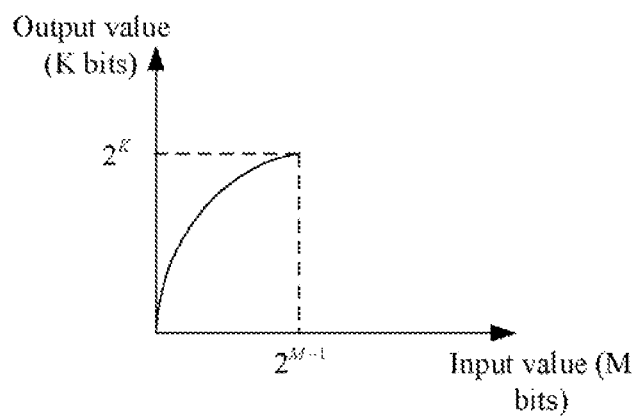
FIG. 3 is another pixel adjusting map and a gamma curve corresponding to another pixel adjusting map, according to the preferred embodiment.

Referring to FIGS. 2-3, two pixel adjusting maps 111a, 111b are shown. Two gamma curves respectively correspond to the pixel adjusting maps 111a, 111b. The pixel values of captured images can be regulated based on the pixel adjusting maps 111a, 111b. in order to adjust the sensitivity of the camera module. Each of the pixel adjusting maps 111a and 111b includes an input range, and an output range corresponding to the input range. Different input ranges result in different or the same output ranges according to different conditions in which the camera module is used. It should be understood that, the pixel adjusting maps 111a, 111b and the corresponding gamma curves are provided as examples to explain characteristics of various pixel adjusting maps that can be configured. The input range of the pixel adjusting map 111a is 0~255. The input range of the pixel adjusting map 111b is 0~127, which is half of that of the pixel adjusting map 111a. However both of the output ranges of the pixel adjusting maps are 0~255. It should be understood that the ratio of the input range of the pixel adjusting map 111a to the input range of the pixel adjusting map 111b can be other than one half, such as one third, one quarter, and so on.

The image capturing unit 12 is configured for capturing an image from the camera module and acquiring pixel values of the image to determine a pixel value range of the pixel values of the image. The image capturing unit 12 can be an image sensor chip.

The comparison unit 13 is configured for comparing the determined range of the pixel values of the image with the input ranges of the pixel adjusting maps 111a, 111b, and determining which one of the input ranges of the pixel adjusting maps 111a, 111b the determined range approximates.

The adjusting unit 14 is configured for adjusting the pixel values of the image in order to adjust the sensitivity of the camera module, according to the pixel adjusting map whose input range is approximately the same as the determined range of the pixel values of the image. The adjusting unit 14 finally outputs the adjusted pixel values to adjust the sensitivity of the camera module, wherein the higher the values of the adjusted pixels, the greater the sensitivity of the camera module.

It should be understood that the system can also include an initialization unit 15, which is configured for initializing or adjusting the input range and the output range of each of the pixel adjusting maps 111a, 111b.

Figure 4:
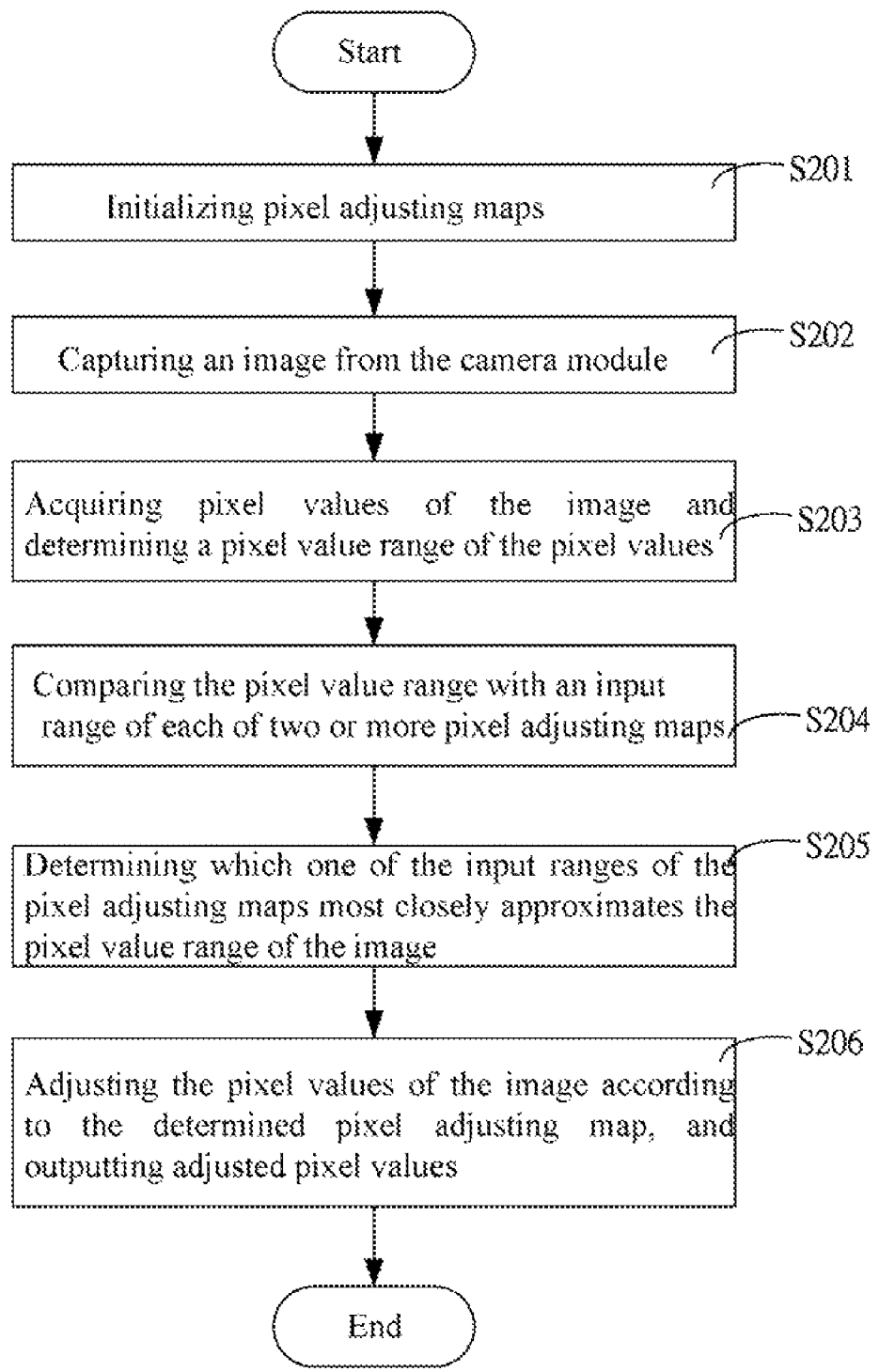
FIG. 4 is a flow chart of a method for adjusting the sensitivity of the camera module of the preferred embodiment.

Referring to FIG. 4, a flow chart of an exemplary method for adjusting the sensitivity of the camera module is shown. The method includes:

step S201, initializing the pixel adjusting maps 111a, 111b;
step S202, capturing an image from the camera module;
step S203, acquiring pixel values of the image, and determining a pixel value range of the pixel values;
step S204, comparing the pixel value range with the input ranges of each pixel adjusting map 111a, 111b;
step S205, determining which one of the input ranges of the pixel adjusting maps 111a, 111b more closely approximates the pixel value range of the image; and
step S206, adjusting the pixel values of the image (thereby adjusting the sensitivity of the camera module) according to the determined pixel adjusting map 111a or 111b and outputting adjusted pixel values.

In step S201, the initialization of the pixel adjusting maps 111a, 111b is carried out before capturing the image. The initialization is carried out via the image capturing unit 12 according to demands of a user and characteristics (or performance) of the camera module, such as exposure time, a self-sensitivity adjusting range of the camera module, and the like.

Figure 5:
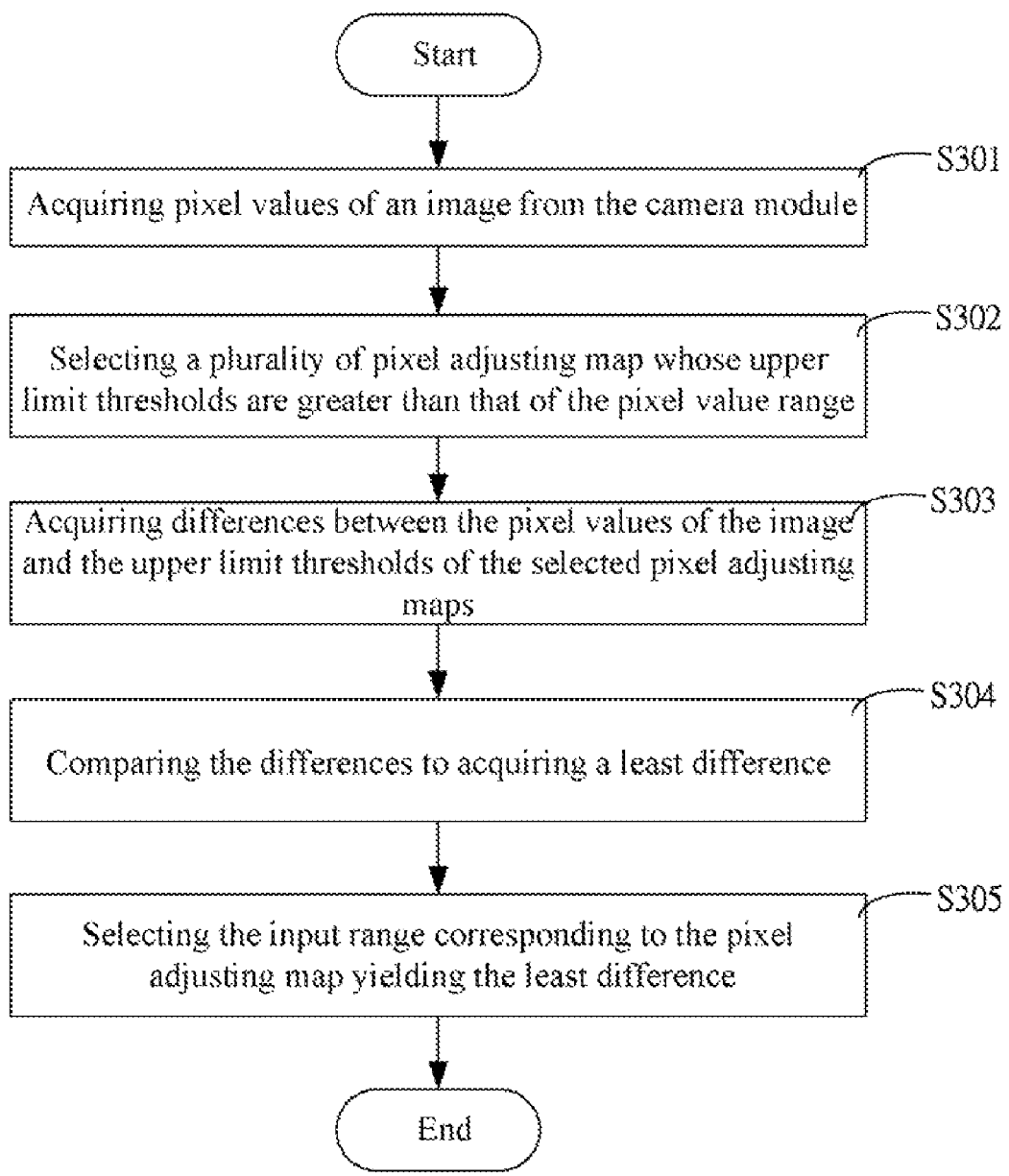
FIG. 5 is a flow chart of steps for determining an input range according to the method of FIG. 4.

FIG. 5 is a flow chart of details of step S203; that is, a flow chart of steps for determining which one of the input ranges of the adjusting maps 111a, 111b more closely approximates the pixel value range of the image. These steps include:

step S301, acquiring pixel values of an image captured by the camera module;
step S302, selecting a plurality of pixel adjusting maps whose upper limit thresholds are greater than that of the pixel value range;
step S303, acquiring differences between the pixel values of the captured image and the upper limit thresholds of the selected pixel adjusting maps;
step S304, comparing the differences to acquire a least difference; and
step S305, selecting the input range corresponding to the pixel adjusting map yielding by the least difference.

In the illustrated embodiment, the compared pixel adjusting maps are the pixel adjusting maps 111a, 111b, and two differences are acquired in step S303. In step 304, the two differences acquired in step S303 are compared. If there are more than two pixel adjusting maps, a corresponding number of differences will be acquired in step S303, and the differences will be compared to acquire a least difference in step S304.

As described above, the system and the method for adjusting the sensitivity of the camera module can dynamically select a pixel adjusting map to adjust the sensitivity of the camera module according to the pixel value range of the images captured by the camera module. The system and the method is able to not only overcome the limiting characteristics of a conventional amplifier, but also decrease or even eliminate unwanted signal noise in the course of adjusting the sensitivity of the camera module.

It should be understood that the above-described embodiment are intended to illustrate rather than limit the invention. Variations may be made to the embodiments including the methods without departing from the spirit of the invention. Accordingly, it is appropriate
that the appended claims be construed broadly and in a manner consistent with the scope of the invention.

What is claimed is:

1. A system for adjusting a sensitivity of a camera module, the system comprising:
a memory unit configured for storing a plurality of pre-initialized pixel adjusting maps, each of the pixel adjusting maps comprising an input range and an output range corresponding to the input range; each input range of each input pixel adjusting map comprising a plurality of input values, each output range of each input pixel adjusting map comprising a plurality of output values; each output value of each pixel adjusting map corresponding to an input value, wherein the ratio of the input range of one pixel adjusting map to the input range of another pixel adjusting map is one third or one quarter;
an image capturing unit configured for capturing an image from the camera module and acquiring pixel values of the image to determine a pixel value range of the pixel values of the image;
a comparison unit configured for comparing the pixel value range with the input ranges of the pixel adjusting maps to determine which one of the input ranges of the adjusting maps most closely approximates the pixel value range of the image; and
an adjusting unit configured for adjusting the pixel values of the image according to the pixel adjusting map whose input range most closely approximates the pixel value range of the image and outputting the adjusted pixel values.

2. The system as claimed in claim 1, wherein an input range of one of the pixel adjusting maps is 0~255.

3. The system as claimed in claim 1, wherein an input range of one of the pixel adjusting maps is 0~127.

4. The system as claimed in claim 1, further comprising an initialization unit configured for initializing the input range of each of the pixel adjusting maps and initializing the output range of the pixel adjusting map corresponding to the input range.

* * * * *